| United States Patent [19] | [11] Patent Number: 4,866,690 |
|---|---|
| Tamaru et al. | [45] Date of Patent: Sep. 12, 1989 |

[54] VIBRATION IMPARTED FOCUS SEARCH DEVICES IN AN OPTICAL TYPE DISC PLAYBACK DEVICE

[75] Inventors: Takuya Tamaru; Tatsuo Fushiki, both of Hamamatsu, Japan

[73] Assignee: Yamaha Corporation, Hamamatsu, Japan

[21] Appl. No.: 885,921

[22] Filed: Jul. 15, 1986

[30] Foreign Application Priority Data

Jul. 19, 1985 [JP] Japan ................. 60-159990

[51] Int. Cl.⁴ ..................... G11B 7/00; G02B 7/04
[52] U.S. Cl. ..................... 369/45; 350/255; 250/201
[58] Field of Search ................. 369/43–46; 290/201 DF; 350/247, 255

[56] References Cited

U.S. PATENT DOCUMENTS

| 4,386,823 | 6/1983 | Musha | 369/45 X |
| 4,408,313 | 10/1983 | Musha . | |
| 4,418,405 | 11/1983 | Barnett et al. . | |
| 4,473,274 | 9/1984 | Yano | 369/44 X |
| 4,555,780 | 11/1985 | Koide | 369/45 X |
| 4,703,466 | 10/1987 | Konno | 369/45 |

FOREIGN PATENT DOCUMENTS

| 371276 | 10/1982 | Austria . | |
| 3214591 | 12/1982 | Fed. Rep. of Germany . | |
| 56-80834 | 7/1981 | Japan | 369/45 |
| 57-58249 | 4/1982 | Japan | 369/44 |
| 57-82234 | 5/1982 | Japan | 369/45 |
| 57-82235 | 5/1982 | Japan | 369/45 |
| 57-88534 | 6/1982 | Japan | 369/45 |

*Primary Examiner*—Aristotelis M. Psitos
*Attorney, Agent, or Firm*—Spensley Horn Jubas & Lubitz

[57] ABSTRACT

A focus search device in an optical type disc playback device comprises an optical system for reading a signal of an optical type disc such as a video disc and a digital audio disc, an optical system moving device for moving the optical system compulsorily in a focusing direction to a focus servo range and a vibration imparting device for imparting vibration to a sliding portion of the optical system such as an object lens while the optical system is being compulsorily moved. Vibration applied to the sliding portion of the optical system puts a shaft and a bearing supporting the optical system in a vibrating state thereby facilitating the movement of the optical system and preventing occurrence of a stick slip.

8 Claims, 4 Drawing Sheets

VIBRATION IMPARTED FOCUS SEARCH DEVICES IN AN OPTICAL TYPE DISC PLAYBACK DEVICE

BACKGROUND OF THE INVENTION

This invention relates to a device for performing focus search smoothly in an optical type disc playback device adapted for playing back discs such as a video disc and a digital audio disc.

For optically picking up information recorded on a disc in an optical type disc playback device, an object lens of an optical pickup head is displaced in a vertical direction to conform to variations in the distance between the object lens and the surface of the disc so that a laser beam for detecting the recorded information will accurately focus on the disc surface. This control operation will hereinafter be referred to as "focus servo".

Since this focus servo has a limited operation range in which the focus servo control can be made, if the object lens is out of this operation range, the focus servo is temporarily suspended and the object lens is pulled back to a reference position, for example, the lowermost position. Then, the object lens is compulsorily moved slowly to enter the operation range. This operation will hereinafter be referred to as "focus search". FIG. 1 shows an example of a prior art focus search circuit.

In FIG. 1, laser beam 11 is irradiated on an optical disc 16 from a laser beam source 13 in an optical pickup head 15 through an object lens 17. The reflected laser beam is received by a focus error detection circuit 19 provided in the optical pickup head 15. Through the object lens 17, and a focusing error thereby is detected.

If the focusing error is within the focus servo range, a drive signal corresponding to the focusing error is applied to a focusing coil 21 by a focus servo control circuit 20 thereby to drive the focus servo.

If the focusing error is out of the focus servo range, the focus servo is temporarily switched off by a focus control circuit 24. Thereupon, the object lens, 17 is pulled back to a reference position (e.g., the lowermost position). By producing, in this state, a ramp voltage which gradually increases in its level and has, for example, a period of several seconds by the focus control circuit 24 and supplying this ramp wave to the focusing coil 21 as a drive signal, the object lens 17 is moved slowly in a direction perpendicular to the disc surface. At this time, the focusing state is watched to restore the focus servo at a point near focus.

In driving the focusing coil 21 by the ramp voltage, however, the speed of moving of the object lens 17 depends largely on states of friction of a shaft and a bearing supporting the object lens 17. Coefficients of friction of these portions vary depending upon factors such as roughness of the surfaces, accuracy in dimensions, physical properties of the material used of the shaft and bearing and environment in which they are placed. When, in particular, the object lens has stopped for a brief moment during its movement, a stick slip (i.e., a state in which the object lens moves irregularly, being repeatedly caught by the bearing) tends to occur due to difference between a dynamic coefficients of friction and a static coefficient of friction of the shaft and the bearing. For overcoming this problem, it has been attempted to employ a shaft coated with a coating containing fluorine as the shaft of the object lens. This approach has however proved costly and moreover inadequate to totally eliminate the problem.

SUMMARY OF THE INVENTION

It is, therefore, an object of the invention to provide a focus search device capable of moving the object lens smoothly during focus search.

For achieving the object of the invention, there is provided a focus search device comprising an optical system for reading a signal of an optical type disc, said optical system including a sliding portion, optical system moving means for moving the optical system compulsorily in a focusing direction to a focus servo range and vibration imparting means for imparting vibration to the sliding portion of the optical system while the optical system is being compulsorily moved.

By the provision of the means for imparting vibration to the sliding portion of the optical system such as an objective lens during focus search, the shaft and bearing supporting the optical system is always put in a vibrating state with the result that the movement of the optical system is facilitated and a smooth focus search can be realized without causing the stick slip.

BRIEF DESCRIPTION OF THE DRAWINGS

In the accompanying drawings.

DESCRIPTION OF A PREFERRED EMBODIMENT

Figure 3:
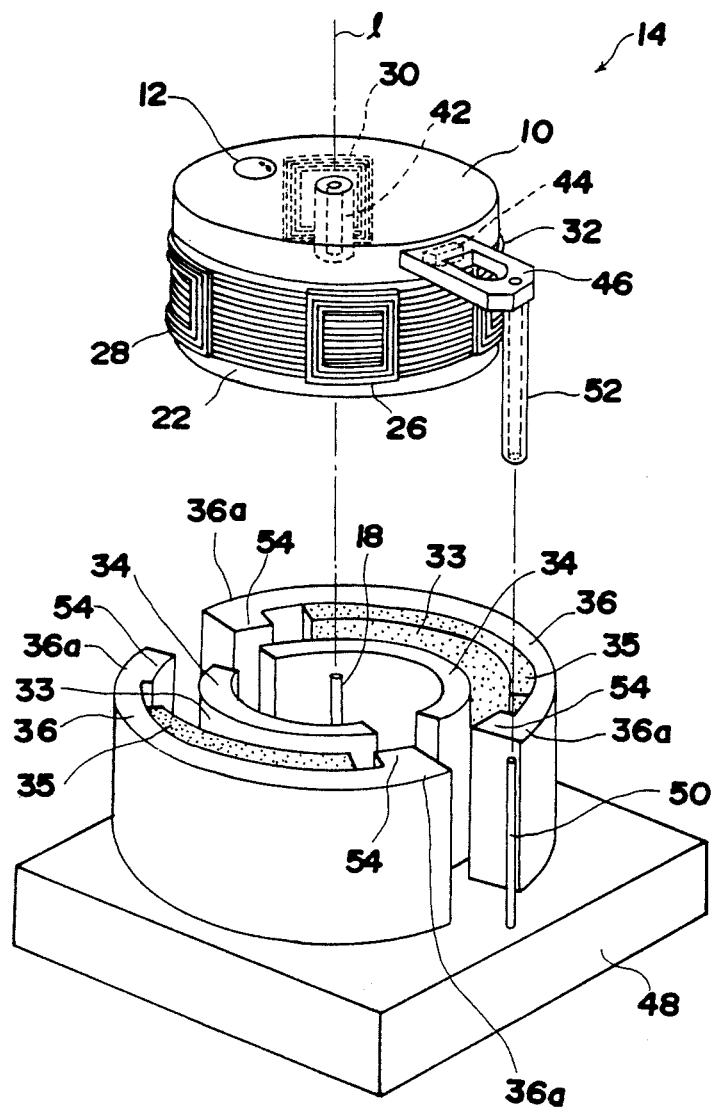
FIG. 3 is an exploded perspective view of an example of an optical pickup head employed in the embodiment of the invention.

Referring first to FIG. 3, an example of an optical pickup head used in the present embodiment of the invention will be described.

In a coil bobbin 10, there is provided a slide shaft insertion sleeve 42 along an axis of rotation of the coil bobbin 10. On the upper surface of the coil bobbin 10 is mounted an object lens 12 in a location offset from the axis of rotation . A focusing coil 22 is wound on the outer peripheral surface of the coil bobbin 10 in its circumferential direction. Four square tracking coils 26, 28, 30 and 32 are provided at an equal interval therebetween on the outer peripheral surface of the focusing coil 22. The coil bobbin 10 is formed on the upper portion of its outer peripheral surface with a damper mounting projection 44 and a damper 46 is mounted to the coil bobbin 10 by inserting the damper mounting projection 44 fittingly in an opening formed in the damper 46. The damper 46 made, for example, of polyurethane, is provided for defining a reference position of the coil bobbin 10 in the vertical and circumferential directions. In the focusing control or tracking control, the coil bobbin 10 is positioned in a position where driving force of the focusing coil 22 or the tracking coils 26, 28, 30 and 32 and restoring force of the damper 46 are balanced with each other. A sleeve 52 for supporting the damper 46 against a base 48 is secured downwardly to the end portion of the damper 46.

The base 48 constitutes a part of a magnetic circuit and is made of a magnetic substance. Inner yokes 34, 34 and outer yokes 36, 36 respectively divided in two pieces are provided integrally on the base 48. Magnets 35, 35 are mounted on the inner peripheral surfaces of the outer yokes 36, 36. The magnets 35, 35 are magnetized in the direction of thickness thereof, i.e., radial direction of the coil bobbin 10 and a magnetic gap 33 is defined between the magnets 35, 35 and the inner yokes 34, 34. The outer yokes 36, 36 are formed longer in the circumferential direction than the magnets 35, 35 and both end portions of each outer yoke 36 extending in the circumferential direction from the circumferential edges of the magnet 35 form extending portions 36a, 36a. In this embodiment, these extending portions 36a, 36a are formed with projections 54, 54 which proximate the inner yokes 34, 34.

In the central portion of the base 48, there is erected a slide pin 18 surrounded by the yokes 34, 34 and 36, 36. This slide pin 18 is inserted in the sleeve 42 formed along the rotation axis of the coil bobbin 10 and supports the coil bobbin 10 rotatably and slidably with respect to the magnetic circuit.

There is also erected a damper shaft 50 on the base 48. This damper shaft 50 is inserted in the sleeve 52 secured to the end portion of the damper 46 thereby supporting the end portion of the damper 46 against the base 48.

Figure 4:
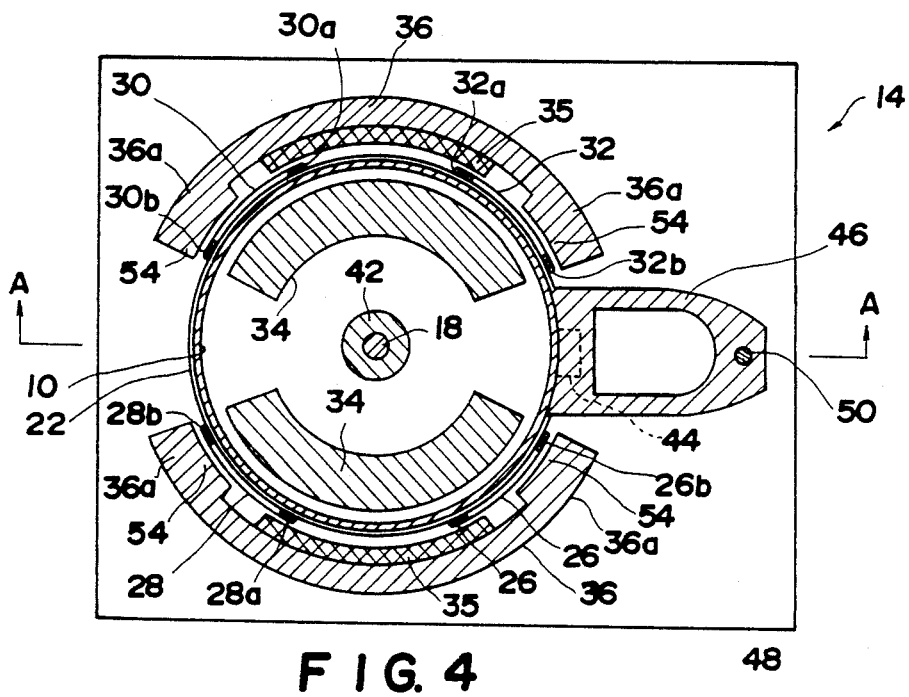
FIG. 4 is a cross sectional view of the optical pickup head of FIG. 3 shown in an assembled state.
Figure 5:
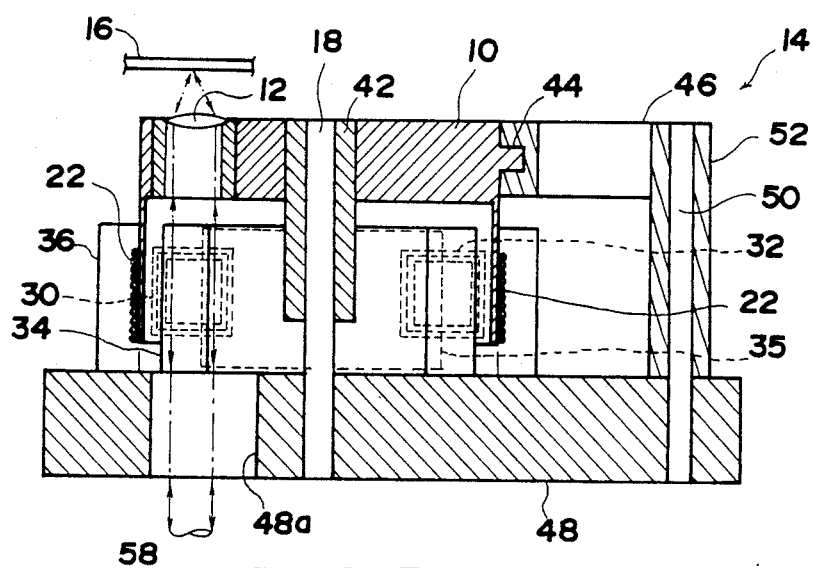
FIG. 5 is a sectional view taken along lines A—A of FIG. 4.

FIG. 4 is a cross sectional view of the optical head of FIG. 3 in its assembled state. FIG. 5 is a sectional view taken along lines A—A in FIG. 4. The reference position of the coil bobbin 10 in the circumferential direction is determined by the damper 46 in such a manner that one sides 26a, 28a, 30a and 32a of the tracking coils 26, 28, 30 and 32 are located in spaces across which the inner yokes 34, 34 are opposed to the magnets 35, 35 and the other sides 26b, 28b, 30b and 32b are located in spaces across which the inner yokes 34, 34 are opposed to the projections 54, 54, 54, 54 of the extending portions 36a, 36a, 36a, 36a of the outer yokes 36, 36. Further, the reference position of the coil bobbin 10 in the vertical direction is determined by the damper 46 in such a manner that the lower edge of the coil bobbin 10 is above the base 48 with a predetermined interval therebetween. The focusing coil 22 and the tracking coils 26, 28, 30 and 32 are provided in such positions that they are always within the height of the magnets 35, 35 regardless of the vertical displacement of these coils.

Incident laser beam 58 for detecting signals is irradiated on a disc 16 through an opening 48a formed in the base 48, the coil bobbin 10 and the object lens 12 as shown in FIG. 5 and a reflected laser beam is incident to a photo-sensor (not shown) through the same path.

According to the above described construction, by causing electric current to flow through the tracking coils 26, 28, 30 and 32, the coil bobbin 10 is rotated on the slide pin 18 to a position in which the driving force by these tracking coils is balanced with the restoring force of the damper 46 whereby the tracking control is performed. The amount of rotation of the coil bobbin 10 in the tracking control varies with the magnitude of electric current. The coil bobbin 10 is rotated in the reverse direction if the direction of electric current is reversed. When electric current is stopped, the coil bobbin 10 is restored to the reference position by the damper 46.

By causing electric current to flow through the focusing coil 22, the coil bobbin 10 slides in the vertical direction along the slide pin 18 to a position in which the driving force of the focusing coil 22 is balanced with the restoring force of the damper 46 so that the object lens 12 is displaced upwardly or downwardly and the focus control thereby is performed. The amount of the slide of the coil bobbin 10 in the focus control varies with the magnitude of electric current. If the direction of electric current is reversed, the coil bobbin 10 is driven in the reverse direction. When electric current is stopped, the coil bobbin 10 is restored to the reference position by the damper 46.

In the above described construction, stick slip tends to occur when the slide pin 18 slides vertically in the sleeve 42.

Figure 1:
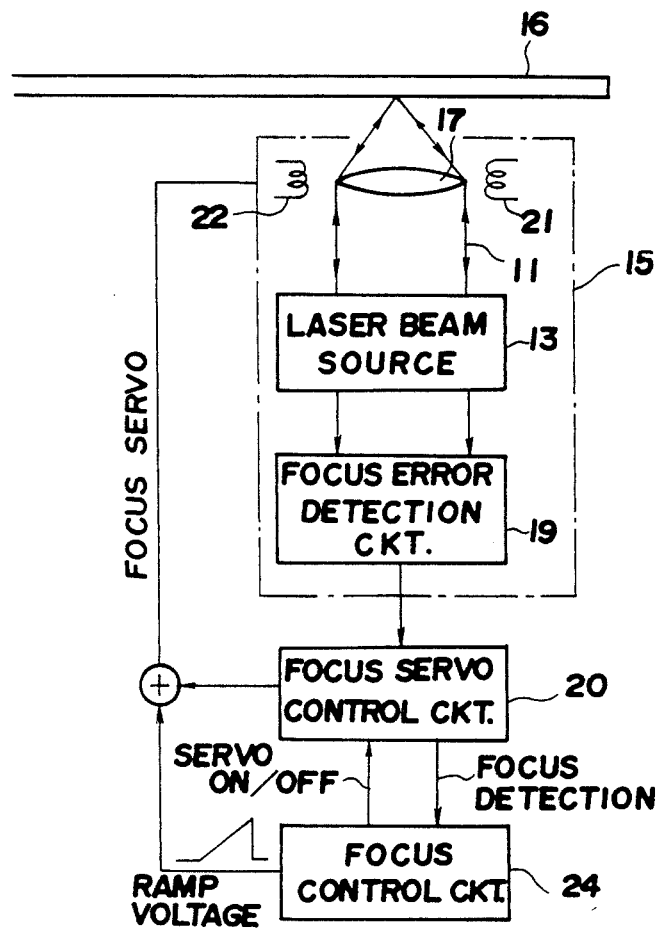
FIG. 1 is a block diagram showing an example of a prior art focus search circuit.
Figure 2:
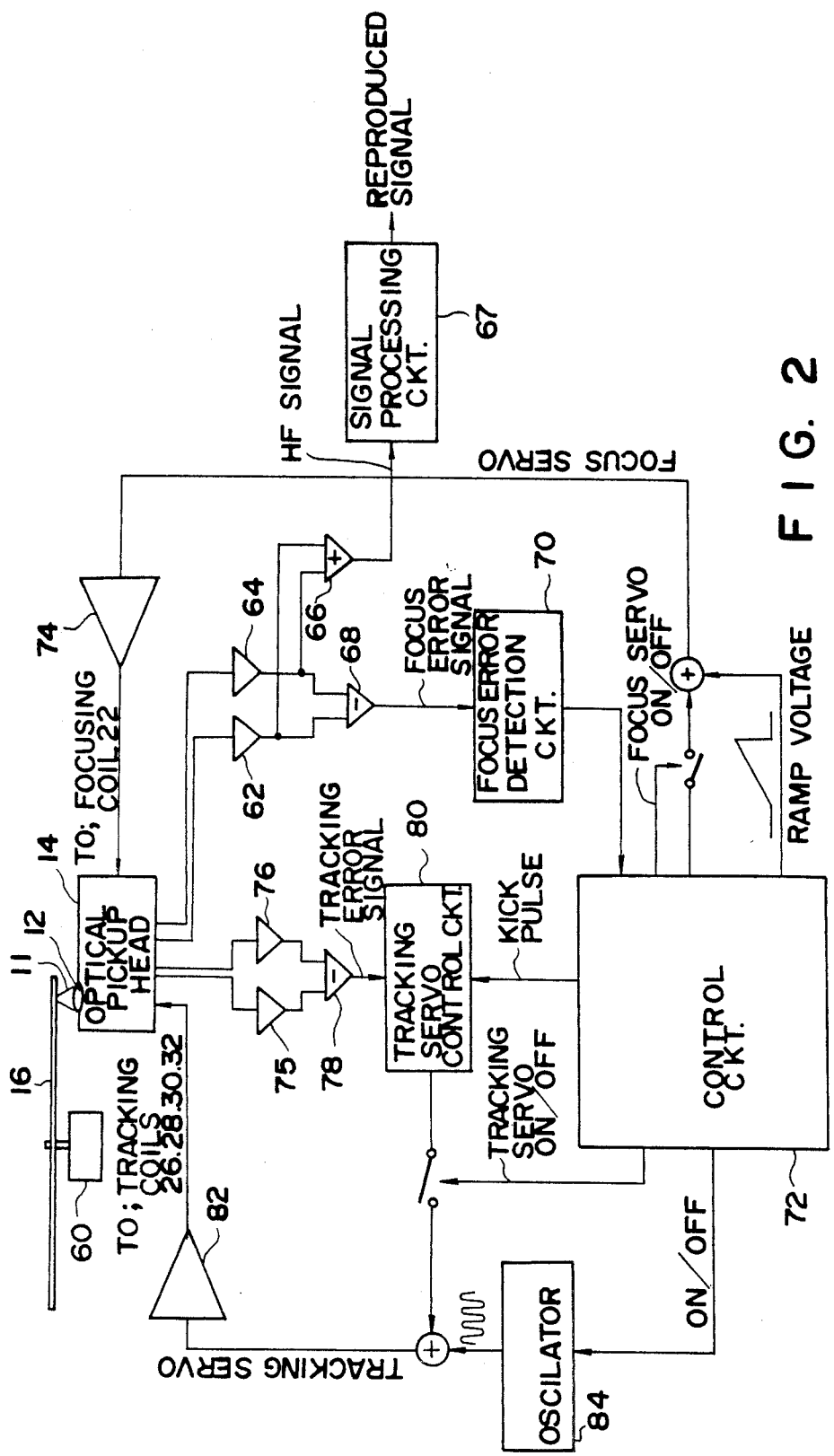
FIG. 2 is a block diagram showing an embodiment of the focus search device of the present invention.

FIG. 2 shows an embodiment of the focus search device according to the present invention employing the above described optical pickup head 14.

In FIG. 2, the optical disc 16 is rotated by a disc motor 60. The optical pickup head 14 irradiates the laser beam 11 consisting of a main beam and a subbeam on the surface of the optical disc 16 on which signals are recorded through the object lens 12 and receives reflected laser beam through the object lens 12. In this embodiment, three beam (three spot) system of tracking and focus servo control is utilized.

Signals on each diagonal of four-split of the received laser beam (main beam) are added together and these added signals are amplified by amplifiers 62 and 64 and thereafter are added together by an adder 66 to produce a HF signal. This HF signal is applied to a signal processing circuit 67 in which reproduction of the picked up signals is effected. On the other hand, the added signals on the respective diagonals are applied to a subtractor 68 from which difference between these added signals is provided as a focus error signal. This focus error signal is supplied to a control circuit 72 through a focus error detection circuit 70. When the focus error signal is being applied to the control circuit 72 (i.e., when the optical system is within the focus servo range), the control circuit 72 performs the focus servo in such a manner that a signal corresponding to the focus error is supplied to the focusing coil 22 (FIG. 3) through an amplifier 74 thereby effecting the focusing control. When the focus error signal is not applied to the control circuit 72 (i.e., when the optical system is out of the focus servo range), the control circuit 72 switches off the focus servo, restoring the coil bobbin 10 to a reference position once and thereafter moves the coil bobbin 10 gradually in the focusing direction by supplying a ramp voltage of, for example, a period of several seconds to the focusing coil 22 thereby performing the focus search.

Received two subbeam signals are amplified by amplifiers 75 and 76 and thereafter applied to subtractor 78 from which difference between the two signals is provided as a tracking error signal. This tracking error signal is applied to a tracking servo control circuit 80 which thereupon supplies a signal corresponding to the tracking error signal to the tracking coils 26, 28, 30 and 32 (FIG. 3) through an amplifier 82 thereby performing the tracking control. The tracking servo control circuit performs a track jump operation upon receipt of a kick pulse from the control circuit 72.

While performing the focus search, the control circuit 72 brings the tracking servo into an OFF state and drives an oscillator 84 to apply an AC signal having a frequency of about 1 KHz to the tracking coils 26, 28, 30 and 32 so as to impart the coil bobbin 10 in the optical system with vibration in the direction of rotation of the coil bobbin 10 about its rotation axis The focusing control by the focus search circuit shown in FIG. 2 is performed in the following manner.

When the optical system is within the focus servo range, the focus servo is ON and the focusing control is performed in response to the focus error signal. When the optical system gets out of the focus servo range, the focus servo is turned OFF and the coil bobbin 10 is once restored to its reference position by the damper 46 and thereafter is gradually moved in the axial direction by application of the ramp voltage. At this time, the tracking servo is OFF and the AC voltage from the oscillator 84 is applied to the tracking coils 26, 28, 30 and 32 so that the coil bobbin 10 is imparted with vibration in the direction of rotation of the coil bobbin 10 about its rotation axis (. This vibration facilitates the sliding movement of the coil bobbin 10 and thus the stick slip between the slide pin 18 and the sleeve 42 is prevented and the upward or downward movement of the coil bobbin 10 caused by the ramp voltage is smoothly effected. The state of focusing is watched and the focus servo is turned ON at a point near focus.

In the above described embodiment, the optical pickup head shown in FIGS. 3 through 4 is employed. The invention however is not limited to this but the same advantageous result of the invention can be expected for a playback device employing other type of optical pickup head by imparting vibration to a slide portion of an object lens of such optical pickup head.

In the above described embodiment, vibration is imparted in the tracking direction. Alternatively, vibration may be imparted in the focusing direction by superposing an C voltage on the ramp voltage used for focus search. Further, an additional coil may be provided for the exclusive purpose of imparting vibration to the slide portion of the object lens.

What is claimed is:

1. A focus search device in an optical type disc playback device comprising:
   an optical system for reading a signal of an optical type disc, said optical system including a support member and a lens assembly which is in sliding contact with the support member;
   optical system moving means for moving the lens assembly compulsorily in a focusing direction to a focus servo range and providing a control signal indicative of such movement; and
   vibration imparting means for imparting vibration at the sliding contact between the lens assembly and the support member in response to the control signal and while the lens assembly is being compulsorily moved.

2. A focus search device as defined in claim 1 wherein said optical system further comprises a tracking actuator and said vibration imparting means applies an oscillating signal to the tracking actuator to impart vibration at the sliding contact between the lens assembly and the support member.

3. A focus search device as defined in claim 2 wherein said oscillating signal is an AC signal having a frequency of about 1 KHz.

4. A focus search device as defined in claim 1 wherein said optical system moving means includes control means for providing a ramp voltage to move said lens assembly compulsorily and wherein said vibration imparting means provides an oscillating signal for superposing on said ramp voltage thereby to cause vibration at the sliding contact.

5. A focus search device in an optical type disc playback device comprising:
   a lens assembly;
   a support member for supporting the lens assembly, wherein the lens assembly is in sliding contact with the support member;
   focus search means for sliding the lens assembly relative to the support member for a focus search operation and providing a control signal indicative of such operation; and
   vibration means for imparting vibration at the sliding contact between the lens assembly and the support member under control of the control signal during the focus search operation.

6. A focus search device as defined in claim 5 wherein the vibration imparting means includes means for providing an oscillating signal to the focus search means so as to impart vibration at the sliding contact between the lens assembly and the support member during the focus search operation.

7. A focus search device as defined in claim 54 further comprising a tracking actuator for moving the lens assembly to track an optical disc and wherein the vibration imparting means applies an oscillating signal to the tracking actuator so as to impart vibration at the sliding contact between the lens assembly and the support member.

8. A focus search device as defined in claim 5 further comprises focusing servo means which operates within a particular range of positions of the lens assembly in reference to the disc for maintaining focus of the lens assembly with respect to the disc, wherein during focus search operation, the focus search means slides the lens assembly relative to the support member to a position within the operating range of the focusing servo means.

* * * * *